United States Patent [19]
Isaksson

[11] Patent Number: 6,137,991
[45] Date of Patent: *Oct. 24, 2000

[54] ESTIMATING DOWNLINK INTERFERENCE IN A CELLULAR COMMUNICATIONS SYSTEM

[76] Inventor: Katarina Isaksson, Rehnsgatan 22, 113 57 Stockholm, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 08/940,648
[22] Filed: Sep. 30, 1997

Related U.S. Application Data
[60] Provisional application No. 60/033,502, Dec. 19, 1996.

[51] Int. Cl.[7] ....................................................... H04B 7/26
[52] U.S. Cl. .......................... 455/67.1; 455/63; 455/67.3; 455/513
[58] Field of Search ................... 455/67.1, 67.3, 455/63, 515, 513, 501, 437, 438

[56] References Cited

U.S. PATENT DOCUMENTS

| | | | |
|---|---|---|---|
| 5,287,544 | 2/1994 | Menich et al. | 455/33.1 |
| 5,335,356 | 8/1994 | Anderson | 455/54.1 |
| 5,375,123 | 12/1994 | Andersson et al. | 370/95.1 |
| 5,428,816 | 6/1995 | Barnett et al. | 455/33.2 |
| 5,507,008 | 4/1996 | Kanai et al. | 455/34.1 |
| 5,606,727 | 2/1997 | Ueda | 455/34.1 |
| 5,822,686 | 10/1998 | Lundberg et al. | 455/161.3 |

FOREIGN PATENT DOCUMENTS

| | | | |
|---|---|---|---|
| 0720407 | 7/1996 | European Pat. Off. | H04Q 7/38 |
| 2308952 | 7/1997 | United Kingdom | H04Q 7/36 |
| 2311912 | 10/1997 | United Kingdom | H04Q 7/36 |
| 9405097 | 3/1994 | WIPO | H04B 7/26 |

*Primary Examiner*—Daniel S. Hunter
*Assistant Examiner*—Thuan T. Nguyen
*Attorney, Agent, or Firm*—Jenkens & Gilchrist

[57] ABSTRACT

A method is disclosed whereby a cellular network's Broadcast Control Channel Allocation BA lists are modified so that the mobile terminals in the network can measure downlink interference on predetermined Broadcast Control Channel Frequencies BCCH frequencies. These measurements can be made in all cells where the mobile terminals are located and then reported back to the base station. The base station maps the reported measurements to corresponding cells, and uses the mapping to produce a cell-to-cell interdependency matrix. For the preferred embodiment, the matrix describes the difference in path loss between cells. This path loss information can be used to derive downlink Carrier to Interference Ratio C/I Carrier to Adjacent Ratio or C/A ratios between cells (or combinations of those ratios) and thus an estimate of the downlink interference in the frequencies assigned to the same cells. Consequently, the downlink interference in the network can be taken into account when new frequencies are to be selected for each cell, which can be used to increase the overall quality of the network (in terms of the C/I).

18 Claims, 2 Drawing Sheets

ESTIMATING DOWNLINK INTERFERENCE IN A CELLULAR COMMUNICATIONS SYSTEM

CROSS-REFERENCE TO RELATED APPLICATION

This Application for Patent claims priority from, and incorporates by reference the disclosure of, co-pending U.S. Provisional Application for Patent No. 60/033,502, filed Dec. 19, 1996.

BACKGROUND OF THE INVENTION

1. Technical Field of the Invention

The present invention relates in general to the telecommunications field and, in particular, to a method for estimating downlink interference in a cellular communications system using a Broadcast Control Channel Allocation (BA) list to determine cell-to-cell interdependencies.

2. Description of Related Art

In order to improve the radio environment of today's cellular communications systems, many operators utilize sector cell (uni-directional) antenna systems, and automated planning techniques to assist with network planning and cell assignment decisions. One such automated planning technique is referred to as (slow) Adaptive Frequency Allocation (AFA), whereby a network operator utilizes an iterative algorithm to automatically and frequently reconfigure the network's cell plan (to minimize radio interference) and gradually improve the quality of the radio environment.

Nevertheless, although AFA is recognized as a substantial improvement over prior network planning approaches, its use creates a significant planning and cell assignment problem. For example, AFA algorithms are currently designed to make cell assignment decisions based on measurements of uplink radio interference in the cells. However, when an operator utilizes AFA in a network with a sector cell antenna system, the uplink and downlink interference measurements made in any given cell (i.e., for a specific channel at a specific point in time) can be poorly correlated. In other words, for any given cell in the network, the uplink measurements that are made do not record the radio interference created by mobile terminals located in the area behind that (sector) cell's base transceiver station (BTS) antenna. However, radio transmissions from other cells located in that same area will create interference on the downlink of the given cell. An example that illustrates the poor correlation between such uplink and downlink measurements is shown in the cell plan of FIG. 1.

Referring to FIG. 1, if an interference measurement were to be made on the uplink in cell A, then interference from cells A120, A180, and A240 would be difficult to detect. Consequently, for that situation, an AFA algorithm might "suggest" to the network operator that cell A use the same frequencies as those used in cells A120, A180 and A240. However, implementation of this "suggestion" would create a significant problem for the mobile terminals located in cell A, because radio transmissions originating in cells A120, A180 and A240 would create interference in cell A on the downlink. Notably, this problem could be avoided, if the downlink interference being created in cell A could be adequately measured or at least accurately estimated.

Numerous problems are encountered when attempts are made to measure downlink radio interference for frequency planning purposes. For example, one technique that can be used is to measure the downlink interference right at the network's base station. However, since the downlink interference is being measured at only one point (e.g., where the base station receiver's antenna is located), this lone reading is inadequate from a testing and operational standpoint. A better approach would be to measure the downlink interference at each of the mobile stations' locations in the cell. The mobile stations would make the measurements and report them to the base station.

Another technique that can be used for downlink interference measurements is to place the measurement equipment at a number of different, fixed locations in a cell. Consequently, the downlink interference in the cell can be measured at all of those fixed locations. Unfortunately, this approach requires a network operator to purchase a substantial amount of additional measurement equipment, which is quite costly to install and maintain. In fact, this added cost typically outweighs the benefits that can be derived from making downlink radio interference measurements at a number of fixed locations in a cell. In other words, in order to obtain the best results with such a downlink measurement approach, the measurement equipment should be located where the majority of the cell traffic occurs (assuming optimistically that the network operator will always have such knowledge beforehand).

Still another technique that can be used for measuring downlink interference in a cellular network is to use measurements based on the mobile's BA lists (or a similar list of frequencies). For example, in the cellular Global System for Mobile Communications (GSM), the GSM mobile terminals measure downlink signal strength only on BCCH frequencies. These BCCH frequencies are defined by the network operator and placed on the mobile's BA lists. However, this technique is limited because the mobile terminals' downlink signal strength measurements are confined to those BCCH frequencies on the BA list, which is no more than a list of the BCCH frequencies used in "neighboring" cells (i.e., cells bordering on one another). Furthermore, of those BCCH frequencies on the BA lists, each GSM mobile terminal can report back to the network's base station only those measurements made for the six strongest BCCH frequencies, where the terminal has successfully decoded the associated Base Station Identity Codes (BSICs).

SUMMARY OF THE INVENTION

It is, therefore, an object of the present invention to facilitate use of downlink interference measurements in a cellular network when new frequencies are being selected for the cells.

It is also an object of the present invention to provide an estimate of the downlink interference in the TCH frequencies assigned to the cells.

It is yet another object of the present invention to increase the overall Carrier-to-Interference ratio (C/I) quality of cellular networks.

In accordance with the preferred embodiment of the present invention, the foregoing and other objects are achieved by a method for use in a cellular communications system, whereby the network's BA lists are modified so that the mobile terminals in the network can measure downlink interference on predetermined BCCH frequencies and in all cells where the mobile terminals are located. These measurements are then reported back to the network base station. Knowing the frequencies measured and BSICs involved, the base station maps the reported measurements to the corresponding cells. The base station uses this mapping to create a cell-to-cell interdependency matrix from the reported measurements. Preferably, the matrix describes the difference in path loss between cells (based on path loss measurements made between mobile terminals and cells), but it can also describe the C/I or Carrier-to-Adjacent ratio (C/A) between cells, or a combination of those ratios. For each cell being served, the base station calculates the path loss (and/or the C/I or C/A) between cells, by subtracting the reported signal strength of the measured cells from another measured cell (with one of those cells being the served cell). The path loss can be calculated for every mobile terminal and every measurement reported, which provides a substantial amount of statistics on the path loss (and/or C/I or C/A) between most cells in the network (i.e., a measure of the interdependency between cells). As such, these calculations of the path loss between cells, which are based on the modified BA list of frequencies, provide an accurate estimate of the downlink interference in the TCH frequencies as well as BCCH frequencies assigned to those cells. Consequently, the downlink interference in the network can be taken into account when new frequencies are being selected for a cell.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
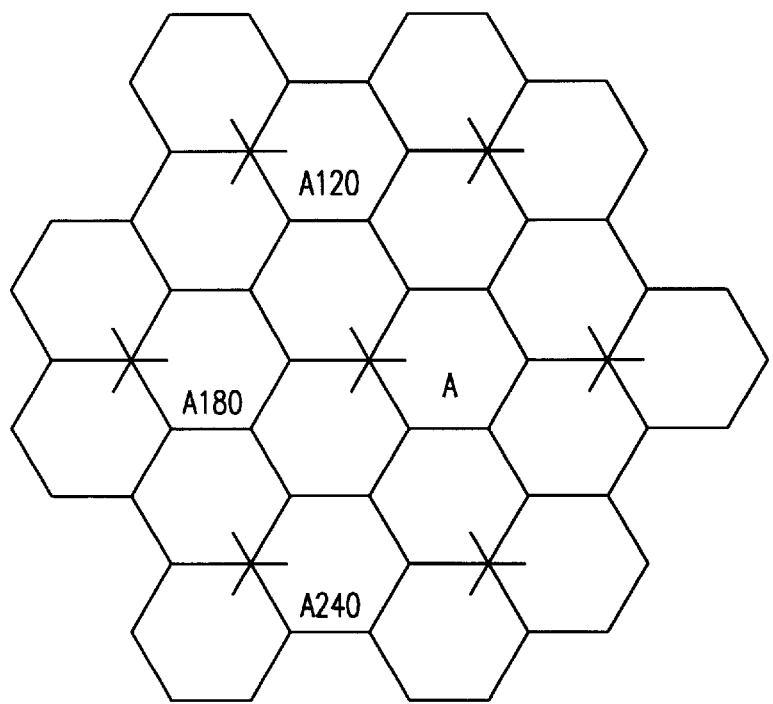
FIG. 1 is a diagram that illustrates an example of poor correlation between uplink and downlink interference measurements in a cellular network.
Figure 2:
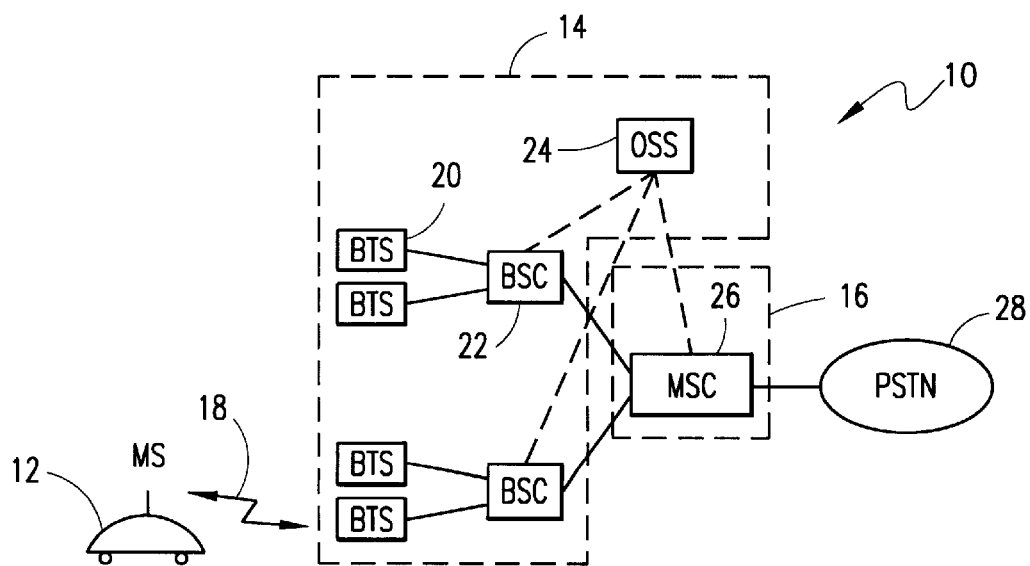
FIG. 2 is a simplified block diagram of an exemplary cellular communications system, which can be used to implement the preferred method and system of the present invention.

The preferred embodiment of the present invention and its advantages are best understood by referring to FIGS. 1–2 of the drawings, like numerals being used for like and corresponding parts of the various drawings.

Essentially, in accordance with a preferred embodiment of the present invention, a cellular network's BA lists are modified so that the mobile terminals in the network can measure downlink interference on predetermined BCCH frequencies. These signal strength measurements can be made on the BCCH frequencies in all cells where the mobile terminals are located (e.g., the six strongest cells per mobile terminal for GSM). These measurements are then reported back to the base station. Knowing the frequencies measured and BSICs involved, the base station system maps the reported measurements to the corresponding cells. The base station system uses this mapping to produce a cell-to-cell interdependency matrix from the reported measurements. Preferably, the matrix describes the differences in path loss between most cells in the network. Alternatively, the matrix can describe the C/I or C/A between those cells. For each cell being served, the base station system calculates the path loss (and/or the C/I or C/A) between cells, by subtracting the reported signal strength of the measured cells from another measured cell (with one of those cells being the served cell). The path loss can be calculated for every mobile terminal and measurement reported, which provides a substantial amount of statistics on the path loss between most pairs of cells in the network (i.e., a measure of the interdependency between cells). This path loss (between cells) information can be used to derive the downlink C/I or C/A information, if the two cells involved have been allocated a co-channel or adjacent channel.

As such, these calculations of the differences in path loss between cells, which are based on the modified BA list of measured frequencies (or a similar list of frequencies for a non-GSM network), provide an estimate of the downlink interference in the frequencies assigned to those cells. Consequently, the downlink interference in the network can be taken into account when new frequencies are being selected for a cell. As a result, for a cellular network using an adaptive algorithm to assign cell frequencies, the number of unnecessary changes will be decreased. Therefore, the risk will be diminished of selecting a frequency for a cell in which there is considered to be no interference on the uplink but interference on the downlink. Moreover, the overall quality of the network (with respect to C/I) will be increased.

Specifically, FIG. 2 is a simplified block diagram of an exemplary cellular communications system, which can be used to implement the preferred embodiment of the present invention. For this embodiment, the exemplary system shown is the GSM. For this example, the network type disclosed is an isometric, hexagonal cellular macro network using sector antennas. However, the inventive concept of estimating downlink interference using a modified BA list, or other similar list of channel frequencies, is not intended to be limited to any particular type of network equipment or antenna system, and can cover, for example, any appropriate type of mobile communications network with omni-directional or adaptive (steerable) antennas.

Exemplary system 10 is divided into three subsystems: a mobile station (MS) 12; a base station subsystem (BSS) 14; and a network subsystem (16). The "zigzag" arrow 18 represents the radio air interface(s) between the BSS 14 and the MS 12. Although only one MS 12 is shown, it is for illustrative purposes only, and it should be understood that system 10 can include a plurality of MSs (12).

The BSS 14 is composed of a plurality of BTSs 20, base station controllers (BSCs) 22, and Operation and Support System (OSS) 24. Each BTS 20 houses the radio transceiver units (not explicitly shown) that define the network's cells. The BSCs 22 manage the radio resources for one or more of the BTSs 20 and provide an interface between the MSs 12 and the mobile services switching center or MSC (26). The OSS 24 provides an operator with supervisory functions for operating and maintaining cellular system 10.

The MSC 26 is a central component of the network subsystem 16. The MSC 26 typically routes calls to and from a Public Switched Telephone Network (PSTN) 28, which is external to cellular system 10.

Generally, in the GSM, each BSC (22) instructs a set of MSs (12) via an associated BTS (20) which other BCCH carriers to measure. This instruction list of other BCCH carriers to measure forms the respective MSs' (12) BA lists. A BCCH is a logical channel which is mapped (along with other control channels) on a single time slot. However, the BCCH can affect other time slots that share the same frequencies (commonly referred to as the BCCH carrier). In the GSM, the BCCH (time slot) is not hopped and is point-to-multipoint (continuously) broadcast.

A BCCH conveys certain information to the set of MSs (12), such as, for example, Location Area Identity (LAI), neighboring BCCH carriers, and a BSIC. Consequently, an active MS (12) always "knows" the cell to which it belongs, and the frequencies (neighboring BCCH carriers, in the GSM) on which to measure signal power. If a MS (12) can successfully decode the BSIC in a BCCH carrier, then it stores the measurement information and reports it back to the base station (over the radio air interface). The MSs (12)

transmit their respective BA reports (including the signal power measurements) to the base station on a regular basis (e.g., every Slow Associated Control Channel period in the GSM).

For the preferred embodiment, in order to use the BA lists for downlink interference estimating, the network operator modifies the nominal BA list of neighboring BCCH carriers to form a predetermined list of BCCH frequencies which the operator desires to include in the MSs' signal strength measurements. Preferably, in this embodiment, the modification is made to include all of the MSs' "surrounding" cells (i.e., not just the "neighboring" or bordering cells), but without deleting any of the nominal BA list frequencies that are to be used for handover purposes. The BA list can be modified for downlink interference estimating purposes as often as desired by the operator. The modified BA list can be broadcast from the BTSs (20) to the MSs (Step 1 of FIG. 3) via a Slow Associated Control Channel (SACCH) using a technique described in the GSM Technical Specification 04.08. Consequently, in response to receiving such modified BA lists, the MSs (12) in each cell can thereby measure the signal strengths (Step 2) of BCCH frequencies for many more cells than just the neighboring cells (depending on the distribution and location of the modified list of cells). The MSs (12) then transmit their respective BA reports (Step 3). The BSS (14) receives and stores all of the MSs' resulting BA reports and categorizes them by cells (Step 4), which provides the operator with a regional cell-to-cell dependency relationship (since the stored reports relate specific cells with numerous other surrounding cells). At this point, the BSS (14) uses the network's frequency plan and BTS (20) power settings, and on a cell-by-cell basis, the BSS (14) computes (using a processor) the estimated downlink interference for the frequencies in the modified BA (Step 5) list. The BSS (14) accumulates the resulting computed estimated downlink interference information, and produces a cell-to-cell interdependency matrix (Step 6). Each element in the matrix represents the path loss difference (and/or C/I or C/A) between the network cells.

For this embodiment, the interdependency matrix is composed of an appropriate number of rows and columns to cover the number of cells in the network. For example, for a network with 100 cells, there can be 100 rows and 100 columns, with each row and column representing a different one of the 100 cells. The difference in path loss (or path gain) between any two cells is stored in the matrix at the intersection of that particular row and column. The path loss difference between pairs of cells (stored at the appropriate row/column intersections) can be calculated, by first calculating the path loss in each cell from the signal strength measurements reported by MSs in each cell (e.g., base station transmit power minus received signal strength measured by the respective MSs). Then the path loss (or path gain) difference between cells can be calculated by algebraically subtracting the path loss computed for a given cell from the path loss computed for the surrounding cells (based on the modified BA list of all surrounding BCCH frequencies, as opposed to just the neighboring or bordering BCCH frequencies). The path loss difference between a pair of cells is then stored at the appropriate row/column intersection in the interdependency matrix. The matrix can be stored in an appropriate memory storage location at the BSS (14). The C/I and C/A between these cells can be calculated from the reported signal strength measurements (based on the modified BA list) in a conventional manner and stored in the matrix, if the cells involved in each calculation are allocated with a co-channel or adjacent channel frequency.

The path loss information stored in the cell-to-cell interdependency matrix provides an estimate of the downlink interference in the frequencies assigned to the same cells. Consequently, the downlink interference in the network can be taken into account when new frequencies are to be selected for each cell, which can be used to increase the overall quality of the network (e.g., in terms of the C/I).

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for use in estimating downlink interference in a cellular communications system, comprising the steps of:

transmitting a predetermined list of channel frequencies;

a plurality of mobile stations measuring a signal strength and decoding an associated base station identifier of a plurality of frequencies from said predetermined list of channel frequencies;

said plurality of mobile stations reporting said signal strength and said associated base station identifier of said plurality of frequencies; and calculating a path loss difference between an associated cell and a plurality of surrounding cells by determining a difference between a computed path loss for the associated cell and a computed path loss for the plurality of surrounding cells to estimate the downlink interference.

2. The method of claim 1, wherein the step of calculating a path loss comprises calculating a path gain.

3. The method of claim 1, further comprising the step of storing said path loss in a cell-to-cell interdependency matrix.

4. The method of claim 1, further comprising the step of storing a carrier-to-interference ratio between said associated cell and said plurality of surrounding cells in a cell-to-cell interdependency matrix.

5. The method of claim 1, wherein said predetermined list of channel frequencies comprises a modified list of broadcast control channel frequencies.

6. The method of claim 1, wherein said cellular communications system comprises GSM.

7. A system for use in estimating downlink interference in a cellular communications system, comprising:

a base station transmitter for transmitting a predetermined list of channel frequencies;

a plurality of mobile stations for measuring a signal strength and decoding an associated base station identifier of a plurality of frequencies from said predetermined list of channel frequencies;

means for reporting said signal strength and said associated base station identifier of said plurality of frequencies to said base station; and means for calculating a path loss difference between an associated cell and a plurality of surrounding cells by determining a difference between a computed oath loss for the associated cell and a computed oath loss for the plurality of surrounding cells to estimate the downlink interference.

8. The system of claim 7, wherein said means for calculating a path loss comprises means for calculating a path gain.

9. The system of claim 7, further comprising means for storing said path loss in a cell-to-cell interdependency matrix.

10. The system of claim 7, further comprising means for storing a carrier-to-interference ratio between said associated cell and said plurality of surrounding cells in a cell-to-cell interdependency matrix.

11. The system of claim 7, wherein said predetermined list of channel frequencies comprises a modified list of broadcast control channel frequencies.

12. The system of claim 7, wherein said cellular communications system comprises GSM.

13. The method of claim 1, wherein said associated base station identifier comprises a Base Station Identity Code (BSIC).

14. The system of claim 7, wherein said associated base station identifier comprises a Base Station Identity Code (BSIC).

15. A system for providing an estimate of downlink interference in a cellular communications network, comprising:
- a transmitter, said transmitter adapted to transmit a predetermined list of channel frequencies;
- a plurality of mobile stations, said plurality of mobile stations adapted to measure a signal strength and decode an associated base station identifier of each of a plurality of frequencies from said predetermined list of channel frequencies;
- said plurality of mobile stations further adapted to report said signal strength and said associated base station identifier of each of said plurality of frequencies to a storage device;
- said storage device further including a processor programmed to categorize, by cells, said reported signal strength into a cell-to-cell interdependency matrix, said cell-to-cell interdependency matrix including a difference in at least one of a path loss, a carrier-to-interference ratio, and a carrier-to-adjacent ratio between a given cell and a plurality of surrounding cells; and
- wherein said cell-to-cell interdependency matrix facilitates an estimate of the downlink interference.

16. The system of claim 15, wherein said at least one of a path loss difference, a carrier-to-interference ratio difference, and a carrier-to-adjacent ratio difference being stored in an associated row and column of said cell-to-cell interdependency matrix.

17. The system of claim 16, wherein said at least one of a path loss difference, a carrier-to-interference ratio difference, and a carrier-to-adjacent ratio difference stored in said cell-to-cell interdependency matrix provides an estimate of the downlink interference in frequencies assigned to said cells within the cellular communications network.

18. The system of claim 15, wherein said associated base station identifier comprises a Base Station Identity Code (BSIC).

* * * * *

UNITED STATES PATENT AND TRADEMARK OFFICE
CERTIFICATE OF CORRECTION

PATENT NO. : 6,137,991
DATED : October 24, 2000
INVENTOR(S) : Katarina Isaksson

Figure 3:
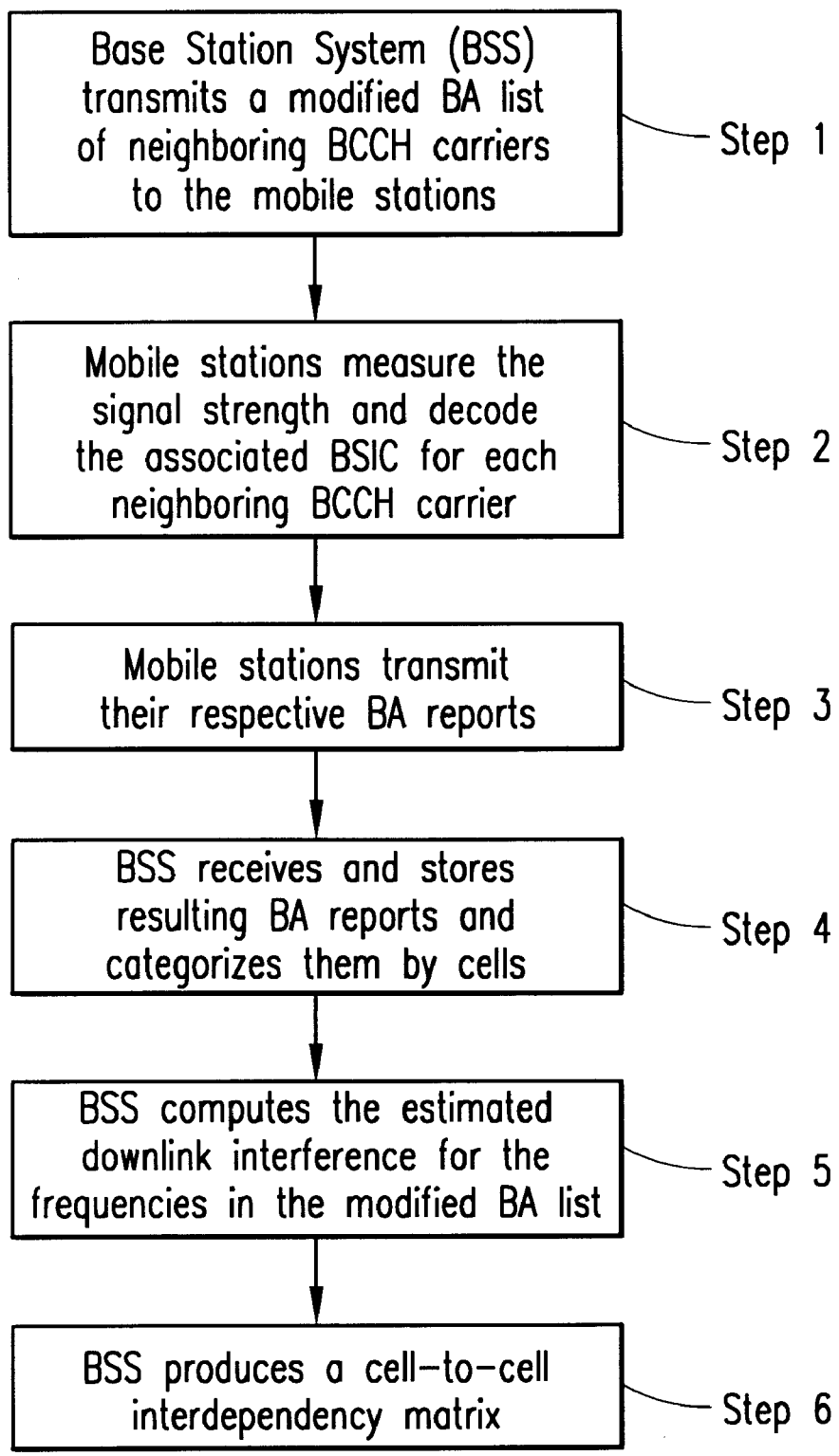

It is certified that error appears in the above-identified patent and that said Letters Patent is hereby corrected as shown below:

| | |
|---|---|
| [73] Assignee | --Telefonaktiebolaget LM Ericsson (publ)-- |
| [57] Abstract | Replace "C/I Carrier to Adjacent Ratio or C/A" With --C/I or Carrier-to-Adjacent Ratio C/A-- |
| Column 3, line 33 | Replace "invention." With --invention. New paragraph FIG. 3 is an exemplary flowchart of a process to estimate downlink interference, which can be used to implement a preferred method and system of the present invention.-- |
| Column 6, line 61 | Replace "oath" With --path-- |

UNITED STATES PATENT AND TRADEMARK OFFICE
CERTIFICATE OF CORRECTION

PATENT NO. : 6,137,991
DATED : October 24, 2000
INVENTOR(S) : Katarina Isaksson

It is certified that error appears in the above-identified patent and that said Letters Patent is hereby corrected as shown below:

Column 6, line 62      Replace "oath"
                            With --path--

Column 8, line 9       Replace "adiacent"
                            With --adjacent--

Signed and Sealed this

First Day of May, 2001

Attest:

NICHOLAS P. GODICI

Attesting Officer        Acting Director of the United States Patent and Trademark Office